US012359637B2

(12) United States Patent
Rajagopalan et al.

(10) Patent No.: US 12,359,637 B2
(45) Date of Patent: Jul. 15, 2025

(54) THERMAL MANAGEMENT SYSTEM

(71) Applicant: J.C. BAMFORD EXCAVATORS LIMITED, Uttoxeter (GB)

(72) Inventors: Ananthan Rajagopalan, Uttoxeter (GB); Rajesh Kumar, Uttoxeter (GB); Shivesh Soni, Uttoxeter (GB); Christopher Andrew Ward, Uttoxeter (GB)

(73) Assignee: J.C. BAMFORD EXCAVATORS LIMITED, Uttoxeter (GB)

( * ) Notice: Subject to any disclaimer, the term of this patent is extended or adjusted under 35 U.S.C. 154(b) by 85 days.

(21) Appl. No.: 18/226,242

(22) Filed: Jul. 25, 2023

(65) Prior Publication Data

US 2024/0026835 A1 Jan. 25, 2024

(30) Foreign Application Priority Data

Jul. 25, 2022 (IN) ............................. 202211042526
Oct. 18, 2022 (GB) ...................................... 2215352

(51) Int. Cl.
*F02D 41/04* (2006.01)
*F01N 3/20* (2006.01)
(Continued)

(52) U.S. Cl.
CPC ......... *F02D 41/042* (2013.01); *F01N 3/2066* (2013.01); *F01P 3/16* (2013.01);
(Continued)

(58) Field of Classification Search
CPC ............ F02D 41/042; F02D 2200/022; F02D 2200/0608; F02D 2200/101; F02D 41/068;
(Continued)

(56) References Cited

U.S. PATENT DOCUMENTS 9,925,885 B2 3/2018 Teraya
9,957,941 B1 * 5/2018 Gerty .................... F02N 19/004
(Continued)

FOREIGN PATENT DOCUMENTS

EP 3318748 A2 5/2018
GB 2527331 A 12/2015
WO WO-2008/085400 A2 7/2008

OTHER PUBLICATIONS

Extended European Search Report issued in EP 23187507.1, dated Feb. 19, 2024.

(Continued)

*Primary Examiner* — Yi-Kai Wang
(74) *Attorney, Agent, or Firm* — MARSHALL, GERSTEIN & BORUN LLP

(57) ABSTRACT

A thermal management system for controlling cooling of an engine system during shutdown, the engine system includes an engine configured to provide power to a working machine, wherein the thermal management system includes a controller which is configured to receive a signal indicative of an engine shutdown command. The controller is further configured to derive, infer or receive a temperature parameter of the engine system and to determine whether the temperature parameter of the engine system is above a first predetermined threshold; and wherein the controller is configured to signal the progressive reduction of a speed of the engine prior to issuing a signal to shutdown the engine in the event that the first predetermined threshold is exceeded when the engine shutdown command is received, thereby cooling the engine system prior to engine shutdown.

20 Claims, 4 Drawing Sheets

(51) Int. Cl.
*F01P 3/16* (2006.01)
*F02D 41/06* (2006.01)

(52) U.S. Cl.
CPC .... *F02D 41/065* (2013.01); *F01N 2610/1453* (2013.01); *F01N 2610/1493* (2013.01); *F02D 2200/022* (2013.01); *F02D 2200/0608* (2013.01); *F02D 2200/101* (2013.01)

(58) Field of Classification Search
CPC .. F02D 41/086; F02D 41/22; F02D 2200/021; F02D 41/065; F01N 3/2066; F01N 2610/1493; F01N 2610/1453; F01P 3/16; F01P 2060/12; F01P 3/20; F01P 11/16; F01P 2031/30; F02B 39/005; F02N 11/0818
USPC .......................................................... 123/41.31
See application file for complete search history.

(56) References Cited

U.S. PATENT DOCUMENTS

| | | | | |
|---|---|---|---|---|
| 11,352,765 | B2 | 6/2022 | Kimura et al. | |
| 2015/0025753 | A1 | 1/2015 | Mori et al. | |
| 2015/0075490 | A1 | 3/2015 | Hull et al. | |
| 2015/0202884 | A1* | 7/2015 | Hegarty | G06K 15/028 347/211 |
| 2017/0350336 | A1* | 12/2017 | Waite, III | F02D 29/02 |
| 2019/0346011 | A1* | 11/2019 | Gerty | F02D 41/042 |
| 2020/0080501 | A1* | 3/2020 | Andre | F02D 41/042 |
| 2021/0131395 | A1* | 5/2021 | Gerty | F02N 11/0844 |

OTHER PUBLICATIONS

United Kingdom Combined Search Report and Examination Report under Sections 17 & 18(3) for Application No. GB2215352.2, dated Mar. 31, 2023.

* cited by examiner

THERMAL MANAGEMENT SYSTEM

FIELD

The present teachings relate to a thermal management system for controlling cooling of an engine system during shutdown, an engine system for a working machine comprising a thermal management system, a working machine comprising an engine system for providing power to the working machine and a method for controlling cooling of an engine system during shutdown.

BACKGROUND

Working machines (such as backhoe loaders, slew excavators, telescopic handlers, forklifts and skid-steer loaders) include an engine system for providing power to the working machine. The engine system commonly includes a diesel internal combustion (IC) engine incorporating fuel injectors and an aftertreatment system located downstream from the engine. The aftertreatment system in some working machines includes selective catalytic reduction (SCR) in which urea—referred to as diesel exhaust fluid (DEF) or Adblue—is injected into a catalyst by a DEF injector. This reduces emissions of Nitrous oxides (NOx) from the exhaust.

Typically, components of the engine system have optimum temperature ranges at which they operate most efficiently and/or meet their design life. If the temperature of the engine components exceeds these ranges, the lifespan of the engine components may be reduced.

The engine system therefore includes a temperature regulation system. During shutdown, if the engine is cut-off immediately, the temperature regulation system stops and the temperatures of the engine components remains high and may increase. It is therefore desirable to include a delayed engine shutdown function, whereby the engine is idled after the operator has issued a command to shutdown the engine. Put another way, the engine is run at a reduced speed to allow the engine components to cool to a lower temperature.

However, running the system at an idle speed uses fuel and therefore reduces the fuel efficiency of the working machine. Additionally, the operator may not appreciate the benefits of the extended idling, and so may choose to override the delayed engine shutdown. This means the engine components are not cooled to a sufficiently low temperature and the lifespan of the engine components may be reduced.

The present teachings seek to overcome or at least mitigate one or more problems associated with the prior art.

SUMMARY

A first aspect of the present teachings provides a thermal management system for controlling cooling of an engine system during shutdown, the engine system comprising an engine configured to provide power to a working machine, wherein the thermal management system comprises: a controller; the controller being configured to receive a signal indicative of an engine shutdown command; the controller being further configured to derive, infer or receive a temperature parameter of the engine system and to determine whether the temperature parameter of the engine system is above a first predetermined threshold; and wherein the controller is configured to signal the progressive reduction of a speed of the engine prior to issuing a signal to shutdown the engine in the event that the first predetermined threshold is exceeded when the engine shutdown command is received, thereby cooling the engine system prior to engine shutdown.

Advantageously, the progressive reduction of the speed of the engine has been found to increase the rate of cooling compared to systems where the engine is idled prior to shutdown. This is partly because components of the working machine powered by the engine, for example a fan of a cooling system, may operate more effectively when the engine speed is progressively reduced, thereby increasing the rate of engine cooling. Therefore, using engine ramp-down as opposed to idling immediately has been found to reduce the fuel consumed to cool one or more components of the engine system to an acceptable level prior to shutdown and/or reduce the time between the shutdown demand and shutdown.

Additionally, when the engine speed is progressively reduced from above idle, and the engine is an internal combustion engine with high pressure injection, the fuel exits the injection system at a greater pressure at higher engine speeds compared to engine idling. This means the energy absorbed from the surrounding components during expansion of the fuel when it exits the injection system is greater, and the rate of engine cooling is increased.

Furthermore, the progressive reduction of the engine speed may have a psychological benefit for the operator. This is because the progressive reduction of the speed is an indication to the operator that the working machine is actively performing the engine shutdown procedure. This means the operator is less likely to override the engine shutdown procedure.

The controller may be configured to signal the progressive reduction of the speed of the engine for a fixed period of time prior to issuing the signal to shutdown the engine.

Advantageously, the fixed period of time is calculated so as to maximize the level of cooling of the engine system whilst minimizing fuel usage, thereby improving overall efficiency of engine shutdown. A fixed time is advantageous as it provides certainty for the operator as to engine shutdown, making it less likely they will override the shutdown delay.

The fixed period of time may be in the range 3 seconds to 60 seconds. The fixed period of time may be in the range 5 seconds to 30 seconds.

Advantageously, progressively reducing the engine running speed for a time period within these ranges have been found to sufficiently cool the engine whilst minimizing fuel usage during engine shutdown.

The progressive reduction of the engine speed may be at least partially in stepped increments.

The progressive reduction of the engine speed may be at least partially linear.

The progressive reduction of the engine speed may be at least partially exponential or logarithmical.

The thermal management system may be configured to run the engine at a predetermined fixed speed after the progressive reduction of the speed of the engine, for example an idle speed.

Advantageously, the progressive reduction of the engine speed reduces the amount of time needed to idle the engine. This has been found to be more efficient compared to systems which solely idle the engine during shutdown.

The controller may be configured to run the engine at the predetermined fixed speed for a predetermined period of time. The predetermined period of time may be in the range 3 seconds to 30 seconds, e.g. 5 seconds to 15 seconds.

Advantageously, idling the engine speed for a time period within these ranges after progressively reducing the engine speed have been found to sufficiently cool the engine whilst efficiently using fuel.

The controller may be configured to issue the signal to shutdown the engine when the thermal management determines that the temperature parameter of the engine system is below a second predetermined threshold, and the second predetermined threshold may be lower than the first predetermined threshold.

Advantageously, this ensures the engine system is sufficiently cooled such that the lifespan of the engine system components may be increased.

The controller may be configured to derive, infer or receive an engine speed parameter of the engine system and signal the progressive reduction of the speed of the engine when the engine speed parameter is above a predetermined threshold and when the temperature parameter is above the predetermined threshold.

The controller may be configured to derive, infer or receive at least one of the following temperature parameters: an exhaust temperature of the engine system; an ambient temperature of the engine system, a fuel temperature, a diesel exhaust fluid temperature and/or a temperature of coolant of the engine system for cooling the engine system.

Advantageously, monitoring these parameters has been found to give an improved indication of the temperature of the engine system. Monitoring more than one of the parameters has been found to give a more accurate indication of the temperature conditions of the engine system, in particular when operating in high ambient temperatures, and also may reduce the need to change the control system when engines are used in different machine installations.

Advantageously, monitoring the coolant temperature has been found to give an improved indication of the temperature of the energy system, and the amount of thermal energy than has been/can be removed from the energy system.

The thermal management system may be configured to cool a fuel injector and/or a diesel exhaust fluid injector during engine shutdown.

Advantageously, cooling the DEF injector and/or fuel injector helps to increase the lifespan of the DEF injector.

The controller may be configured to perform a purge operation on the diesel exhaust fluid injector during engine shutdown to purge the diesel exhaust fluid from the diesel exhaust fluid injector.

Advantageously, purging the DEF injector helps to prevent DEF from crystallizing and blocking the DEF injector. The blocking of the DEF injector can reduce the lifespan of the DEF injector.

The thermal management system may include a sensor arrangement configured to monitor the temperature parameter and/or the engine speed parameter.

The thermal management system may include a restart function, and the controller may be configured to receive a signal indicative of a restart command and restart normal operation.

Advantageously, this means the operator can restart normal operation and the thermal management if, for example, the operator decides to restart the working machine during engine shutdown.

The controller may be configured to isolate a device for adjusting the speed and/or power of the engine so as to prevent the operator from overriding the thermal management system by actuating the device for adjusting speed and/or power of the engine during engine shutdown.

Advantageously, this means the operator cannot override the engine shutdown by using, for example, the accelerator pedal or the hand throttle. This could lead to an inefficient use of fuel, and potentially negate or reduce the effectiveness of the thermal management system.

The thermal management system may further include a fixed speed mode, and the controller may be configured to run the engine at a fixed speed, e.g. an idle speed, when the controller has determined that the speed of the engine has exceeded a predetermined high speed threshold within a predetermined time period prior and the engine is running at an idle speed prior to the engine shutdown command being issued.

Advantageously, when the engine is already running at a speed within the idle speed threshold following a spike in engine speed, this function avoids the engine from increasing to a speed greater than the idle speed after a shutdown command and progressively reducing back now to idle speed. This may appear unconventional to the operator.

The thermal management system may be configured to store the parameter of the engine system and the progressive reduction of the speed of the engine during shutdown.

Advantageously, the stored parameters can be used to provide a picture of the shutdown pattern of the engine system, and can be used, for example, in warranty claims to confirm the engine shutdown procedure has been correctly initiated and the components of the engine system have been cooled as intended.

The engine shutdown command may be configured to be produced in response to the operator actuating an engine shutdown device, for example a key, a button or a switch.

A second aspect of the present teachings provides a thermal management system for controlling cooling of an engine system during shutdown, the engine system comprising an engine configured to provide power to a working machine, wherein the thermal management system comprises: a controller; the controller being configured to receive a signal indicative of an engine shutdown command; the controller being further configured to derive, infer or receive a temperature parameter of the engine system and to determine whether the temperature parameter of the engine system is above a predetermined threshold; the controller being further configured to derive, infer or receive an engine speed parameter of the engine system and to determine whether the engine speed parameter is above a predetermined speed threshold within a fixed time period prior to the engine shutdown command being received; and wherein the controller is configured to signal the engine to run for an extended period after receiving the signal indicative of an engine shutdown command and to then issue a signal to shutdown the engine in the event that the predetermined speed threshold is exceeded within the predetermined time period prior to the signal indicative of an engine shutdown command being received, and the predetermined temperature threshold is exceeded when the engine shutdown command is received, thereby cooling the engine system prior to engine shutdown, optionally wherein the controller is configured to monitor a plurality of temperature parameters of the engine system and if any of said parameters are above a predetermined threshold the controller is configured to signal the engine to run for an extended period.

A third aspect of the present teachings provides an engine system for a working machine, the engine system comprising: an engine configured to provide power to a working machine; a thermal management system according to the first or second aspect; and a sensor arrangement in communication with the controller and configured to monitor a temperature parameter of the engine system, wherein the sensor arrangement is configured to monitor at least one of: an exhaust temperature of the engine system; a coolant temperature, a fuel temperature, a diesel exhaust fluid temperature and/or an ambient temperature of the engine system.

The engine system may include a fuel injector configured to supply fuel to the engine system, and the fuel injector may be configured to be cooled by the thermal management system.

Advantageously, cooling the fuel injector helps to increase the lifespan of fuel injector.

The engine system may comprise a coolant circulation system configured to circulate coolant around the engine system, and the thermal management system may be configured to monitor a temperature of the coolant. The engine system may include a fan configured to cool the engine during engine shutdown, and a speed of the fan may be directly or indirectly proportional to the speed of the engine.

Advantageously, the fan helps to cool the engine system during engine shutdown. As the engine speed is progressively reduced and the engine speed is proportional to fan speed, the rate of cooling produced by the fan is greater compared to system wherein the engine is idled during shutdown.

A fourth aspect of the present teachings provides a working machine including an engine system according to the third aspect for providing power to the working machine.

A fifth aspect of the present teachings provides a method for controlling cooling of an engine system during shutdown, the engine system comprising an engine configured to provide power to a working machine, the method comprising the steps of: receiving a signal indicative of an engine shutdown command; deriving, inferring or receiving a temperature parameter of the engine system and determining whether the temperature parameter of the engine system is above a first predetermined threshold; and progressively reducing a speed of the engine in the event that the first predetermined threshold is exceeded when the engine shutdown command is received, thereby cooling the engine system; and subsequently issuing a signal to shutdown the engine.

BRIEF DESCRIPTION OF THE DRAWINGS

Embodiments will now be described with reference to the accompanying drawings, in which.

DETAILED DESCRIPTION OF EMBODIMENT(S)

Figure 1:
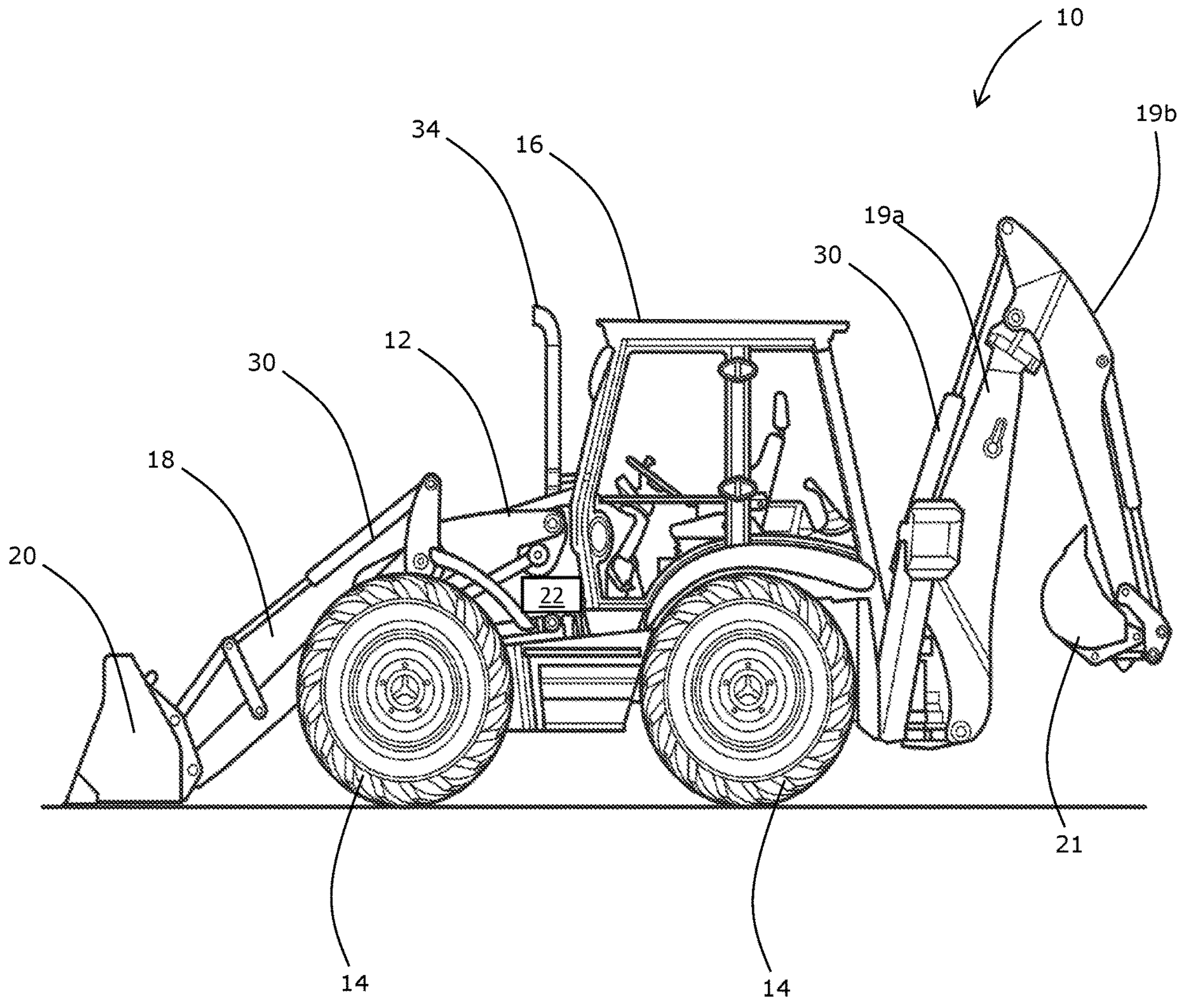
FIG. 1 is a side view of a working machine comprising a thermal management system according to the present teachings.

Referring firstly to FIG. 1, a working machine is indicated generally at 10. In the illustrated embodiments, the working machine is a backhoe loader 10. In alternative embodiments, the working machine 10 is a different type of working machine, e.g., an excavator, a forklift, a telehandler or a skid steer loader.

The working machine 10 includes a body 12 supported on a ground engaging structure in the form of wheels 14, and a cab 16 for an operator. The body mounts a plurality of working arms. Specifically, a pair of front loader arms 18 (one shown) are pivotable about a horizontal axis to mount a working implement 20, in this embodiment a shovel 20. A rear backhoe includes a boom 19*a* pivotably mounted to the body 12 for movement about a vertical and horizontal axis at one end, and itself mounts a dipper 19*b* for pivotable movement about a further horizontal axis. The free end of the dipper 19*b* mounts a bucket 21 for performing excavating functions. The shovel 20 and the bucket 21 may however be exchanged for alternate attachments (not shown) such as forks, pallet forks, breaker hammers and the like, as is well known.

Figure 2:
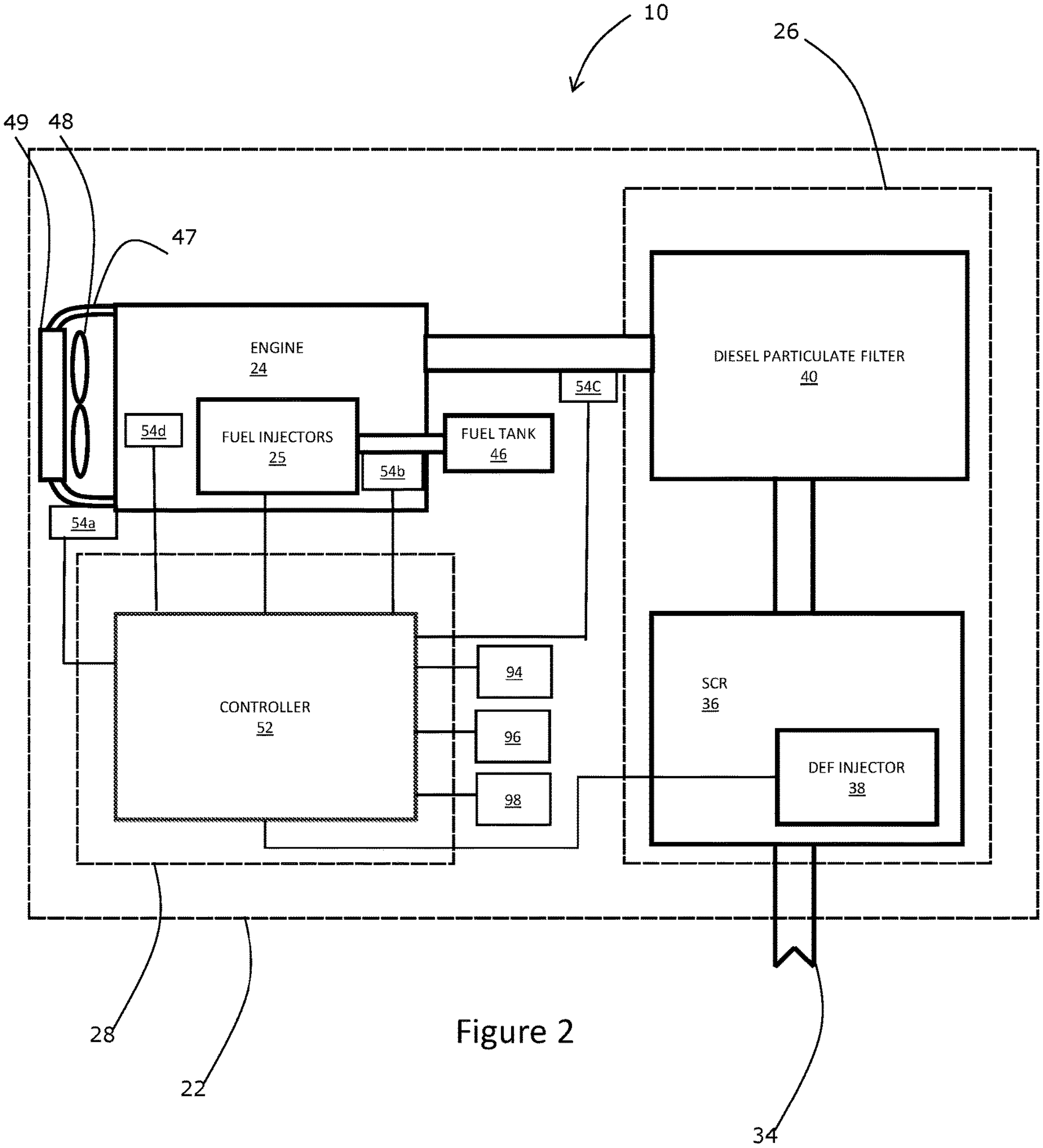
FIG. 2 is a block diagram of the thermal management system of FIG. 1.

As illustrated in FIGS. 1 and 2, the working machine 10 includes an engine system 22 with an engine 24 incorporating fuel injector(s) 25 (typically one per cylinder), an aftertreatment system 26 and a thermal management system 28. The engine system 22 also includes a fuel pump (not shown), in fluid communication with a fuel tank 46, and a coolant circulation system 47 including a coolant pump (not shown), a heat exchanger 49 and a fan 48. It shall be appreciated that any combination of the components of the engine system may be included or omitted.

In this embodiment, the engine 24 is a diesel internal combustion (IC) engine 24, however it shall be appreciated that in alternative embodiments the engine 24 may comprise one or more of a diesel fueled engine, a petrol fueled (gasoline) engine, a gas fueled engine (e.g. hydrogen or CNG) and/or an electric motor. The engine 24 runs at a range of operational speeds during operation of the working machine 10, and may also run at an idle speed. The idle speed is generally in the range 750 rpm to 800 rpm. In alternative embodiments, any suitable idle speed may be used.

The engine 24 provides propulsion to the wheels 14 via a suitable transmission and drivetrain (not shown). The engine 24 also powers a hydraulic pump (not shown) that via a suitable spool valve (not shown) linked to operator controls enable the operator to selectively supply hydraulic fluid to one or more hydraulic actuators 30 to manipulate the working arms 18, 19*a*, 19*b* and thereby perform working operations. In alternative working machines, the engine may additionally or alternatively power electrical generators, power take-offs, lifting booms, tipping mechanisms or the like.

The fuel injector 25 is controlled by an electrically controlled valve (not shown) at its tip or nozzle that is supplied with pressurized fuel from the fuel tank 46 by the fuel pump and when energized, atomizes the fuel into a fine mist so that it can burn in the engine 24 such that the engine runs at a required speed of the engine. In some embodiments, the fuel injector 25 may be provided with an internal cooling system forming part of the coolant circuit to allow coolant to circulate around the fuel injector 25 so that the coolant can transfer heat away from the fuel injector 25.

The coolant pump pumps coolant around the coolant circulation system 47. The coolant circulation system 47 removes heat energy from the engine system 22 and expels it to atmosphere, thereby cooling the engine system 22. It shall be appreciated that any suitable arrangement of coolant circulation system may be used to cool the components of the engine system 22. The operation of the cooling system may at least partially be driven by the engine 24. For example, the coolant system may be provided with a coolant reservoir, galleries in an engine block, cylinder head etc. of the engine and one or more heat exchangers 49 and a coolant pump that is driven by the engine 24 and circulates the coolant through the galleries where heat is transferred from the engine and then into the heat exchanger.

The fan 48 is used to force air past the heat exchanger containing the coolant to cool it before it returns to the galleries. The fan 48 may also cool the engine 24 directly by drawing air past it within an engine compartment or canopy during operation of the working machine and during extended engine shutdown. In this embodiment, the fan 48 is powered directly or indirectly by the engine 24, and a speed of the fan 48 is proportional or influenced by the speed of the engine 24.

With reference to FIGS. 1 and 2, exhaust gases from the engine 24 exit via the aftertreatment system 26. The aftertreatment system 26 includes an exhaust duct 34, a selective catalytic reducer (SCR) 36 with a diesel exhaust fluid (DEF) injector 38, and a diesel particulate filter (DPF) 40. It shall be appreciated that in alternative embodiments, any of the devices in the aftertreatment system may be included and/or omitted. In some embodiments, the aftertreatment system 26 may include an ammonia slip catalyst and/or a diesel oxidation catalyst.

The aftertreatment system 32 is used to treat gases that are exhausted (generally termed "exhaust gases") from the engine 28. For example, treatment may include reducing the amount of particulate matter and/or nitrous oxides that are to be exhausted from the engine 28 to the surrounding environment.

The DPF 40 removes diesel particulate matter such as soot from the exhaust gas using a filtration system. The DPF 40 is of the type that can actively regenerate to remove an accumulation of particulate matter when vehicle operating conditions are such that particulate matter in the DPF is not reduced passively by heat generated from the engine 24 itself. Active regeneration may be achieved by injecting additional fuel late in the combustion cycle of the engine 24 to elevate exhaust temperatures and therefore the temperatures within the DPF 40 such that the rate of PM burn-off exceeds that of PM accumulation, and regeneration occurs. Active regeneration therefore causes particularly high temperatures in the engine system 22.

The SCR 36 uses a catalyst and reductant for converting nitrogen oxides (NOx) into diatomic nitrogen ($N_2$) and water. The SCR 36 includes the DEF injector 38, which injects reductant into a flow of exhaust gas for the conversion of NOx to occur. It shall be appreciated that in alternative embodiments, the injector may inject a fluid other than DEF. The DEF injector 38 may include a DEF injector body (not shown) and a DEF injector tip (not shown). In some embodiments, the DEF injector body may surround at least part of the DEF injector tip and may be provided with an internal cooling system forming part of the coolant circuit to allow coolant to circulate around the DEF injector body so that the coolant can transfer heat energy away from the DEF injector 38.

As illustrated in FIG. 2, the thermal management system 28 is provided to cool the components in the engine system 22 during engine shutdown by implementing an engine shutdown control strategy. The thermal management system 28 includes a controller 52 and a sensor arrangement 54. It shall be appreciated that in alternative embodiments, the sensor arrangement 54 may be omitted.

The controller 52 may be a microprocessor or a microcontroller that is part of, or incorporated into, an existing control unit of the working machine, for example an engine control unit (ECU). Alternatively, the controller 52 of the thermal management may be separate from the ECU.

In this embodiment, certain engine system components have upper temperature thresholds. If the components are exposed to temperatures above these thresholds, the lifespan of the engine components may be reduced.

The fuel injectors 25 and the DEF injector 38 have been found to be components that are susceptible their lifespan being reduced. It has been found to be advantageous to continue to run the engine 24 after an operator engine shutdown command, in order to enhance the cooling of inter alia these components.

The controller 52 is configured to receive an engine shutdown command. The engine shutdown command is issued by the operator. The engine shutdown command is configured to be produced in response to the operator actuating an engine shutdown device 94. The engine shutdown device may be any suitable device, for example a key, a button or a switch. In alternative embodiments, the working machine may be configured to issue the engine shutdown command automatically at a preprogramed time.

The controller 52 is further configured to derive, infer or receive a temperature parameter of the engine system 22 (hereinafter "temperature parameter") and to determine whether the temperature parameter is above a first predetermined threshold. In this embodiment where there is a sensor arrangement 54, the sensor arrangement 54 is configured to monitor the temperature parameter of the engine system 22. However, in alternative embodiments where the sensor arrangement 54 is omitted, the controller may be configured to use an algorithm to derive or infer the temperature parameter. Alternatively, the controller 52 may use a combination of algorithms and sensor inputs to determine the whether the temperature parameter is above the predetermined threshold.

The temperature parameter may be at least one of: an exhaust temperature of the engine system 22, an ambient temperature of the engine system 22, a temperature of coolant of the engine system 22, a temperature of fuel flowing from the fuel tank 46 to the fuel injectors 25 and/or a temperature of DEF flowing to the DEF injector 38. It shall be appreciated that any of these temperature parameters may be used by the controller 52 either alone or in combination. The use of different temperature parameters has been found to give a more accurate picture of the temperature profile of the engine system 22. This means the controller 52 will more accurately initiate the engine shutdown strategy, which will therefore increase the overall efficiency of the working machine 10.

In particular, this has been found to be advantageous for machines that operate in environments where air temperatures are high, such as tropical or sub-tropical regions. In these circumstances a single parameter, such as exhaust temperature has been found not to provide adequate information on the temperature profile of the engine components. This may be because of the higher ambient temperatures inhibiting the ability of heat energy to rapidly transfer to the surrounding components and then to the atmosphere, due to temperature gradients being inherently shallower.

Additionally, by monitoring multiple parameters, the system may be implemented with little or no adaptation for particular machine installations. That is, where the engine system is packaged differently for different machines, resulting in different airflows and heat transfer between components, monitoring of multiple parameters may limit the need to "tune" or adjust individual parameters for that installation.

In this embodiment, the controller 52 uses the coolant temperature, the fuel temperature and the exhaust temperature. The sensor arrangement 54 therefore includes a coolant temperature sensor 54*a* (located in the coolant system), a fuel temperature sensor 54*b* (located in the fuel supply line) and an exhaust temperature sensor 54*c* (located in the exhaust system downstream of the engine 24).

It shall be appreciated that the specific sensors will vary depending on the temperature parameters used by the controller 52. For example, in embodiments where the controller uses the DEF temperature and/or the ambient temperature, a DEF temperature sensor and/or an ambient temperature sensor (e.g. located on an air intake of the engine) may be used in the sensor arrangement. Typically, these sensors are required for other control systems—for example for the ECU and/or for an emissions control system—and therefore the thermal management system 28 of the present teachings may be implemented without significantly increasing costs.

In this embodiment, the controller 52 is further configured to use, derive, infer or receive an engine speed parameter of the engine system 22, and to determine whether the engine speed parameter is above a predetermined threshold. Similarly to the temperature parameter, in this embodiment the controller 52 receives a signal from an engine speed sensor 54*d*. It shall be appreciated that in alternative embodiments, the controller 52 may use an algorithm to infer or derive the engine speed parameter.

According to this embodiment, in order for the controller 52 to initiate the engine shutdown control strategy, the engine speed must be above the predetermined threshold and at least one of the temperature parameters must be above the predetermined threshold. Put another way, the controller 52 logic is that the engine speed is above the predetermined threshold and only one of the temperature parameters needs to be above the predetermined threshold to initiate the engine shutdown control strategy.

In alternative embodiments, the controller 52 may only use the temperature parameter to determine whether to initiate the engine shutdown control strategy.

The coolant temperature threshold in this embodiment is 100° C. It shall be appreciated that the coolant temperature threshold may be any suitable temperature depending on the type of engine system, for example a threshold value between 100° C. and 115° C.

The fuel temperature threshold in this embodiment is 70° C. It shall be appreciated that the fuel temperature threshold may be any suitable temperature depending on the type of engine system, for example a threshold value between 65° C. and 90° C.

The exhaust temperature threshold in this embodiment is 450° C. It shall be appreciated that the exhaust temperature threshold may be any suitable temperature depending on the type of engine system, for example a threshold value between 400° C. and 550° C. The engine speed threshold is 1200 rpm. It shall be appreciated that the engine speed threshold may be any suitable speed depending on the type of engine system, for example a threshold value between 1000 rpm and 1500 rpm.

In embodiments where the controller 52 uses the DEF fluid temperature, the DEF temperature threshold may be any suitable temperature threshold depending on the working machine, for example between 50° C. and 70° C.

In this embodiment, when the controller 52 has determined that the engine speed parameter and the temperature parameter are above the respective predetermined thresholds, the controller 52 is further configured to isolate a device 98 for adjusting the speed and/or power of the engine 24, for example a hand and/or foot throttle 98.

This is to prevent the operator from overriding the thermal management system 28 by actuating the device for adjusting the speed and/or power of the engine during engine shutdown. This could lead to an inefficient use of fuel, and potentially cause further damage to the engine system 22. The controller 52 is further configured to isolate the hydraulic actuators 30 of the working machine, to prevent the operator from performing particular functions of the working machine 10. It shall be appreciated that in alternative embodiments, either of these features may be omitted or included.

In this embodiment, the aftertreatment system 26 includes an SCR 36 with a DEF injector 38, as described above. During operation of the DEF injector 38, the formation of crystals of DEF within the DEF injector 38 adversely affect the supply of DEF to the aftertreatment system 26. For example, the formation of DEF crystals at the DEF injector tip may prevent the injection of DEF and the formation of DEF crystals within the body of the DEF injector may prevent movement of a supply value, thus preventing the supply of DEF.

During engine shutdown, the controller 52 is configured to perform a purge operation on the DEF injector 38 to purge the DEF from the DEF injector 38. The purge operation is configured to clear the DEF injector and DEF supply pipework of DEF which could crystalize over time.

When the controller 52 has determined that the engine speed parameter and the temperature parameter are above the respective predetermined thresholds, the device for adjust speed/power of the engine 24 has been isolated, and the hydraulic actuators have been isolated, the controller 52 issues a signal to progressively reduce the speed of the engine 24 prior to issuing a signal to shutdown the engine 24. The controller 52 may indicate to the operator, for example via a device such as a display 96, that a normal hot shutdown has been initiated (i.e. that the speed of the engine 24 is being progressively reduced).

It shall be appreciated that in alternative embodiments, the DEF purge operation and/or the isolation of the device for adjusting speed/power of the engine may be omitted. In this embodiment, the DEF purge operation occurs during the progressive reduction of the speed of the engine, however in alternative embodiments the DEF purge operation may occur prior to the progressive reduction of the speed of the engine 24 or after the engine has shutdown.

In order to progressively reduce the speed of the engine 24, the controller 52 signals the progressive reduction of the delivery of fuel through the fuel injectors 25 for each combustion cycle, thereby reducing the speed of the engine 24 and resulting in cooling of the components of the engine system 22.

It has been found to be more fuel efficient to progressively reduce the speed of the engine 24 during engine shutdown, as opposed to immediately reducing the speed of the engine 24 down to an idle speed as with known engine shutdown control strategies.

This is, in part, because the components of the cooling system which are powered by the engine, may operate more effectively when the engine speed is progressively reduced. Using progressive speed reduction as opposed to idling immediately has therefore been found to reduce the fuel consumed to cool one or more components in the engine system to an acceptable level prior to shutdown, and/or to reduce the time between the shutdown command and engine shutdown.

In relation to the fuel injectors 25, cooling of the injector tip occurs at least in part due to the pressurized fuel depressurizing as it exits the injector nozzle and in doing so liberating heat energy from the nozzle. The pressure of the fuel in the injectors 25 is elevated at higher engine speeds (in excess of 1000 bar compared to approx. 500 bar at idle) and therefore cooling of the is more effective.

Figure 3A:
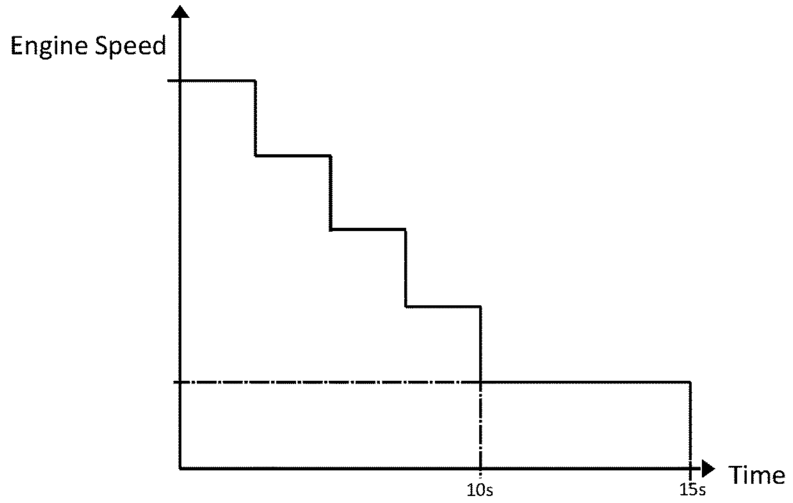
FIGS. 3*a-c* are graphs showing a speed of an engine during engine shutdown.
Figure 3B:
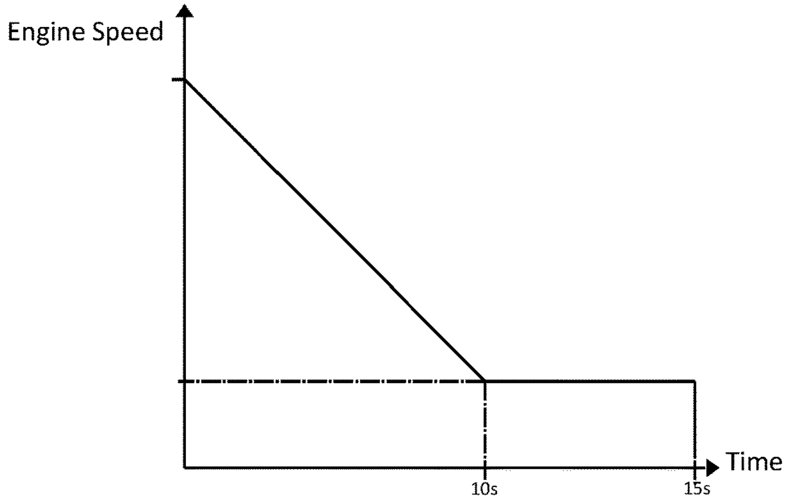
Figure 3C:
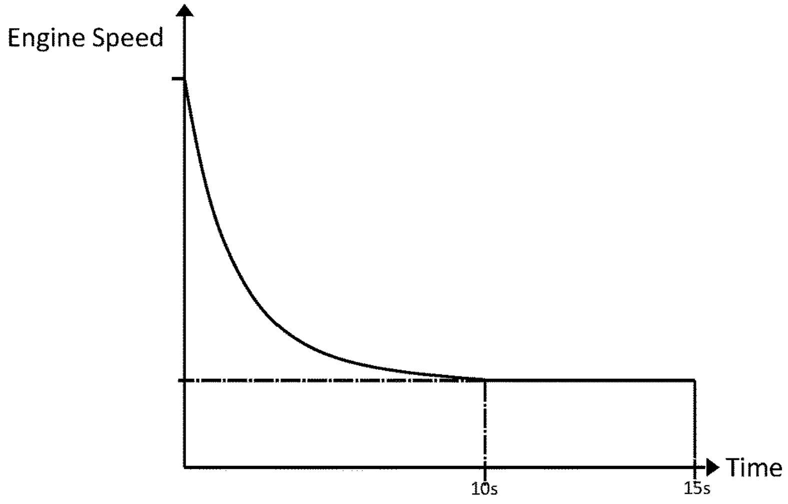

In this embodiment, the controller 52 may progressively reduce the speed of the engine 24 for a fixed time. The fixed time may be in the range of 3 seconds to 60 seconds, optionally in the range 5 seconds to 30 seconds. In this embodiment, the fixed time is 10 seconds. FIGS. 3*a*-*c* illustrate the possible reductions patterns of the speed of the engine 24 over the fixed time period.

In FIG. 3*a*, the speed of the engine 24 is reduced in steps. In FIG. 3*b*, the speed of the engine 24 is reduced linearly. In FIG. 3*c*, the speed of the engine 24 is reduced exponentially or logarithmically. It shall be appreciated that in alternative embodiments, a combination of stepped, linear, logarithmic and/or exponential speed reduction may be employed by the controller 52.

In this embodiment, after the controller 52 has progressively reduced the speed of the engine 24 for the fixed time, the controller 52 is configured to run the engine 24 at a predetermined fixed speed.

The fixed speed is illustrated in FIGS. 3*a* to 3*c*. In this embodiment, the fixed speed is an idle speed. The idle speed is in the range 750 rpm to 800 rpm. In alternative embodiments, any suitable fixed speed may be used.

The controller 52 is configured to run the engine at the fixed speed for a fixed time period. The fixed time period may be in the range 3 seconds to 30 seconds, for example 5 seconds to 15 seconds. In this embodiment, the fixed time period is 5 seconds. Once the controller 52 determines that the speed of the engine 24 has been progressively reduced for 10 seconds and run at the fixed speed for 5 seconds, the controller 52 issues a signal to shutdown the engine 24. It shall be appreciated that in alternative embodiments, the fixed time period may be omitted.

The controller 52 may be configured to store the temperature parameter of the engine system 22 and the value of the progressive reduction of the speed of the engine 24, and/or the fixed period during engine shutdown. The stored parameters can be used to provide a picture of the shutdown pattern of the engine system 22, and can be used, for example, in warranty claims to confirm the engine shutdown procedure has been correctly initiated and the components of the engine system have been cooled as intended.

In alternative embodiments, instead of progressively reducing the speed of the engine and/or running the engine at the fixed speed for fixed time periods, the controller 52 may determine when the temperature parameter is less than a second predetermined threshold. The second predetermined threshold is lower than the first predetermined threshold. In this embodiment, the controller issues the engine shutdown command when the controller determines that the temperature parameter is less than the second predetermined threshold. Advantageously, this helps to ensure that the components of the engine system 22 are sufficiently cooled, regardless of the starting temperature.

In a further alternative embodiment, the controller may progressively reduce the speed of the engine for a fixed period of time, and then run the engine at idle speed until the temperature parameter is less than the second predetermined threshold.

The thermal management system 28 may further include a restart function, operable between the issuance of the engine shutdown command and the signal to shutdown the engine. When the restart function is employed, the controller 52 is configured to receive a signal indicative of a restart command and restart normal operation of the engine 24. For example, the shutdown device 94 may issue the signal indicative of the restart command. The restart function is advantageous in case the operator changes their mind and wishes to restart normal operation. It would be an inefficient use of fuel to have to wait for the thermal management system 28 to progressively reduce the speed of the engine 24 and then idle the speed of the engine 24.

The controller 52 may be further configured to receive a signal indicative of an override command. The override command may be issued by the operator actuating a suitable device, for example a button or a switch, if the operator wishes to shutdown the engine 24 immediately. This may be a further function of the shutdown device 94, e.g. a further key position. When the controller 52 receives the signal indicative of the override command, the controller issues the signal to shutdown the engine 24.

In a further embodiment, the thermal management system 28 may further include a fixed speed mode. In the fixed speed mode, the controller is configured to determine whether the speed of the engine has exceeded a predetermined high running speed threshold within a predetermined time period prior to the engine shutdown signal being issued. For example, the high-speed threshold may be 1600 rpm, and the fixed period of time may be 5 seconds. In alternative embodiments, any suitable high-speed threshold and any suitable fixed period of time may be used.

If the speed of the engine has exceeded the high running speed threshold before engine shutdown and the operator has deactivated the device 98 for adjusting the speed/power of the engine 24, then the speed of the engine 24 will have been reduced to an idle speed. However, given the recent high speed running, the temperature parameters may remain elevated. In this situation, if the control strategy of the above embodiment was implemented, the speed of the engine 24 would rise from the idle speed to a higher speed, and then be progressively reduced back down to idle speed. This may be perceived as unconventional by the operator, who make take undesirable action, such as applying the emergency override.

In the fixed speed mode, the controller is therefore configured to continue to run the engine at the fixed speed (i.e. the idle speed) when it has been determined that the speed of the engine has exceeded a predetermined high speed threshold within a predetermined time period prior to the engine shutdown signal being issued.

In a further alternative embodiment, the fixed period of time for which the speed of the engine is progressively reduced may be increased depending on the operating state of the engine system prior to engine shutdown.

For example, if the controller determines that DPF regeneration has occurred prior to the engine shutdown command being issued, then temperatures of the components of the engine system 22 may be higher than in normal operation. It may therefore be advantageous to increase the fixed time periods for progressively reducing the speed of the engine 24 and for idling the engine 24, to help ensure the components of the engine system 22 are sufficiently cooled.

Figure 4:
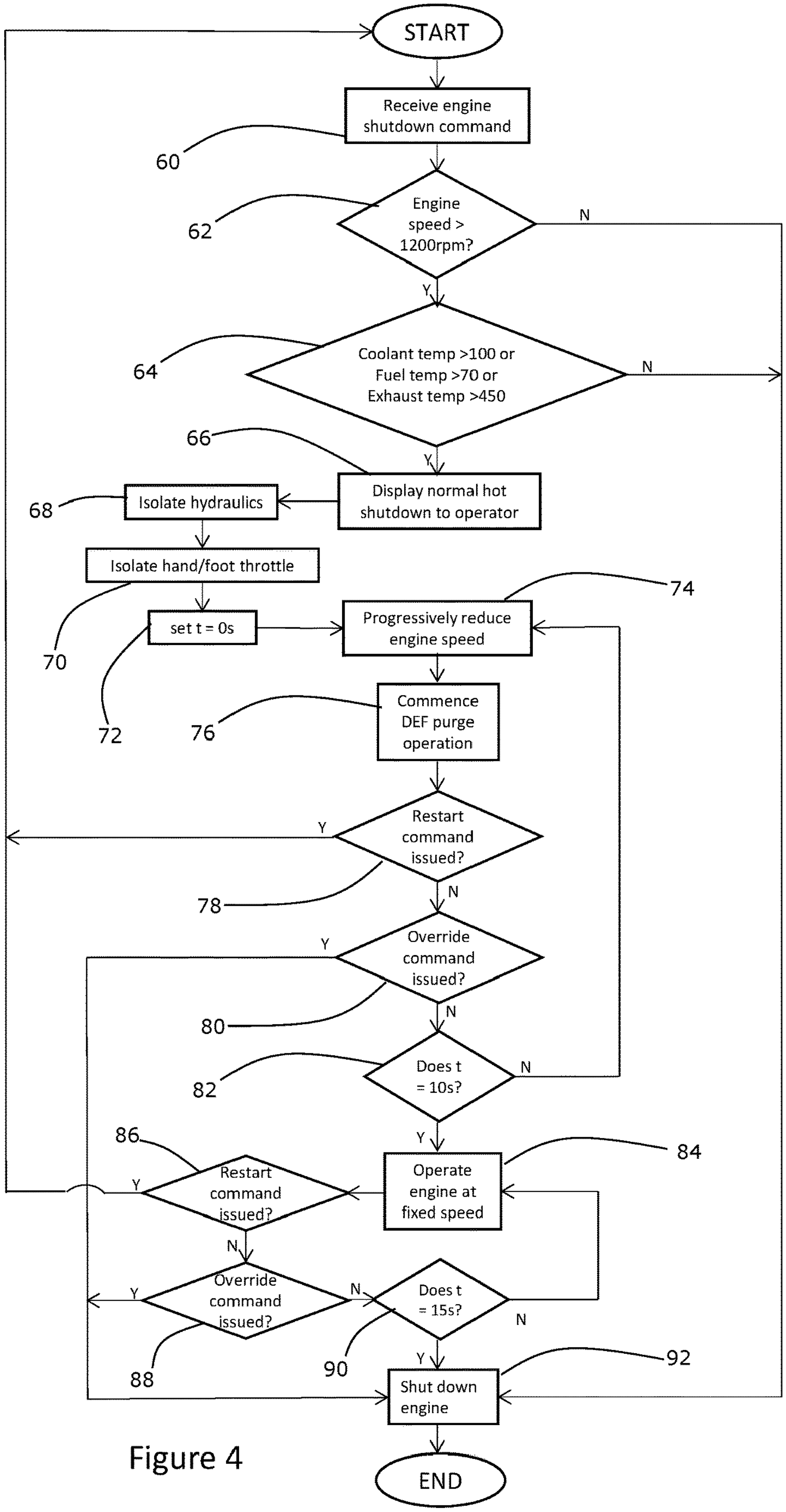
FIG. 4 is a flow chart of a method of controlling the thermal management system of FIG. 1.

The operation of the engine control strategy for the thermal management system 28 will now be described with reference to FIG. 4. It shall be appreciated that this is one example of many different variations of engine control strategy which can be used to cool the engine system 22 during engine shutdown.

At step 60, the controller 52 is configured to receive a signal indicative of the engine shutdown command. The signal is issued in response to the operator actuating the engine shutdown device 94 (e.g. a button, switch or key) to the off position.

At step 62, the controller 52 determines whether the engine speed is greater than the predetermined threshold value of 1200 rpm. If the controller 52 determines that the engine speed is less than the threshold value of 1200 rpm, the controller 52 issues the signal to shutdown the engine at step 92. If the controller 52 determines that the engine speed is greater than the threshold value of 1200 rpm, the control logic moves on to step 64.

At step 64, the controller 52 determines whether at least one of the coolant temperature, fuel temperature or exhaust temperature are above the temperature threshold values described above of 100° C., 70° C. and 450° C. respectively. If the controller 52 determines that none of the temperature parameters are above the predetermined values, the controller issues the signal to shutdown the engine at step 92. If the controller 52 determines that at least one of the temperature parameters is above the predetermined value, the control logic moves on to step 66.

At step 66, the controller 52 indicates to the operator via the display 96 that the engine control strategy has been initiated (i.e. a normal hot shutdown). At step 68, the controller 52 isolates the hydraulic actuators 30 and at step 70 the controller 52 isolates the device 98 for adjusting the speed/power of the engine 24 and moves onto step 72.

At step 72, the controller sets a timer to t=0 s and begins to progressively reduce the speed of the engine at step 74.

At step 76, the controller 52 signals initiation of the DEF purge operation. In this embodiment, the purge operation is performed from when the progressive reduction of the engine speed begins to when the signal to shutdown the engine is issued.

Step 78 illustrates the restart function of the thermal management system 28. The controller 52 determines whether the restart command has been issued. If the controller 52 determines that the restart command has been issued, the controller 52 restarts normal operation of the working machine 10. If the controller 52 determines that the restart command has not been issued, the control logic moves to step 80.

At step 80 the controller 52 determines whether the command to override the thermal management system 28 has been issued by the operator. If the controller 52 determines that the override command has been issued, the controller 52 issues the signal to shutdown the engine 24 at step 92. If the controller 52 determines that the override command has not been issued, the control logic moves to step 82.

The controller 52 continues to progressively reduce the speed of the engine 24 until t=10 s at step 82. The controller 52 then runs the engine 24 at the fixed speed, i.e. the idle speed, at step 84. Steps 86 and 88 are substantially the same as steps 78 and 80, whereby the controller 52 determines whether the restart command or the override command have been issued.

The controller 52 runs the engine at the fixed speed until t=15 s at step 90. The controller then issues the signal to shutdown the engine at step 92.

Although the teachings have been described above with reference to one or more preferred embodiments, it will be appreciated that various changes or modifications may be made without departing from the scope as defined in the appended claims. For example the teachings may be applied to enhancing the longevity of other engine components such as turbochargers, superchargers and the like which may also be affected by excessive temperatures.

The invention claimed is:

1. A thermal management system for controlling cooling of an engine system during shutdown, the engine system comprising an engine configured to provide power to a working machine, wherein the thermal management system comprises:

a controller;

the controller being configured to receive a signal indicative of an engine shutdown command; the controller being further configured to derive, infer or receive a temperature parameter of the engine system and to determine whether the temperature parameter of the engine system is above a first predetermined threshold;

wherein the controller is configured to signal the progressive reduction of a speed of the engine prior to issuing a signal to shutdown the engine in the event that the first predetermined threshold is exceeded when the engine shutdown command is received, thereby cooling the engine system prior to engine shutdown; and wherein the progressive reduction of the speed of the engine is a gradual decrease in the speed of the engine over a period of time from a first engine speed above an idle speed to a second engine speed lower than the first engine speed.

2. The thermal management system of claim 1, wherein the controller is configured signal the progressive reduction of the speed of the engine for a fixed period of time prior to issuing the signal to shutdown the engine, optionally wherein the fixed period of time is in the range of 3 seconds to 60 seconds, for example in the range 5 seconds to 30 seconds.

3. The thermal management system of claim 1, wherein the progressive reduction of the engine speed is at least partially in stepped increments.

4. The thermal management system of claim 1, wherein the progressive reduction of the engine speed is at least partially linear.

5. The thermal management system of claim 1, wherein the progressive reduction of the engine speed is at least partially exponential or logarithmical.

6. The thermal management system of claim 1, configured to run the engine at a predetermined fixed speed after the progressive reduction of the speed of the engine, for example the idle speed, optionally wherein the controller is configured to run the engine at the predetermined fixed speed for a predetermined period of time, optionally wherein the predetermined period of time is in the range 3 seconds to 30 seconds.

7. The thermal management system of claim 1, wherein the controller is configured to issue the signal to shutdown the engine when the thermal management determines that the temperature parameter of the engine system is below a second predetermined threshold, and wherein the second predetermined threshold is lower than the first predetermined threshold.

8. The thermal management system of claim 1, wherein the controller is configured to derive, infer or receive an engine speed parameter of the engine system and signal the progressive reduction of the speed of the engine when the engine speed parameter is above a predetermined threshold and when the temperature parameter is above the predetermined threshold, optionally further comprising a sensor arrangement configured to monitor the temperature parameter and/or the engine speed parameter.

9. The thermal management system of claim 1, wherein the controller is configured to derive, infer or receive at least one of the following temperature parameters: an exhaust temperature of the engine system; an ambient temperature of the engine system, a fuel temperature, a diesel exhaust fluid temperature and/or a temperature of coolant of the engine system for cooling the engine system.

10. The thermal management of claim 1, wherein the thermal management system is configured to cool a fuel injector and/or a diesel exhaust fluid injector during engine shutdown, optionally wherein the controller is configured to perform a purge operation on the diesel exhaust fluid injector during engine shutdown to purge the diesel exhaust fluid from the diesel exhaust fluid injector.

11. The thermal management system of claim 1, comprising a restart function, wherein the controller is configured to receive a signal indicative of a restart command and restart normal operation.

12. The thermal management system of claim 1, wherein the controller is configured to isolate a device for adjusting the speed and/or power of the engine so as to prevent the operator from overriding the thermal management system by actuating the device for adjusting speed and/or power of the engine during engine shutdown.

13. The thermal management system of claim 1, further comprising a fixed speed mode, wherein the controller is configured to run the engine at a fixed speed, e.g. the idle speed, when the controller has determined that the speed of the engine has exceeded a predetermined high speed threshold within a predetermined time period prior and the engine is running at the idle speed prior to the engine shutdown command being issued.

14. The thermal management system of claim 1, configured to store the parameter of the engine system and the progressive reduction of the speed of the engine during shutdown.

15. The thermal management system of claim 1, wherein the engine shutdown command is configured to be produced in response to the operator actuating an engine shutdown device, for example a key, a button or a switch.

16. An engine system for a working machine, the engine system comprising:

an engine configured to provide power to a working machine;

a thermal management system according to claim 1; and a sensor arrangement in communication with the controller and configured to monitor a temperature parameter of the engine system, wherein the sensor arrangement is configured to monitor at least one of: an exhaust temperature of the engine system; a coolant temperature, a fuel temperature, a diesel exhaust fluid temperature and/or an ambient temperature of the engine system.

17. The engine system of claim 16, wherein the engine system comprises a fuel injector configured to supply fuel to the engine system, and wherein the fuel injector is configured to be cooled by the thermal management system and/or wherein the engine system comprises a coolant circulation system configured to circulate coolant around the engine system, and wherein the thermal management system is configured to monitor a temperature of the coolant, optionally wherein the engine system comprises a fan configured to cool the engine during engine shutdown, and wherein a speed of the fan is directly or indirectly proportional to the speed of the engine.

18. A working machine comprising an engine system according to claim 16 for providing power to the working machine.

19. A thermal management system for controlling cooling of an engine system during shutdown, the engine system comprising an engine configured to provide power to a working machine, wherein the thermal management system comprises:

a controller;

the controller being configured to receive a signal indicative of an engine shutdown command; the controller being further configured to derive, infer or receive a temperature parameter of the engine system and to determine whether the temperature parameter of the engine system is above a predetermined threshold; the controller being further configured to derive, infer or receive an engine speed parameter of the engine system and to determine whether the engine speed parameter is above a predetermined speed threshold within a fixed time period prior to the engine shutdown command being received; and wherein the controller is configured to signal the engine to run for an extended period after receiving the signal indicative of an engine shutdown command and to then issue a signal to shut down the engine in the event that the predetermined speed threshold is exceeded within the predetermined time period prior to the signal indicative of an engine shutdown command being received, and the predetermined temperature threshold is exceeded when the engine shutdown command is received, thereby cooling the engine system prior to engine shutdown, optionally wherein the controller is configured to monitor a plurality of temperature parameters of the engine system and if any of said parameters are above a predetermined threshold the controller is configured to signal the engine to run for an extended period.

20. A method for controlling cooling of an engine system during shutdown, the engine system comprising an engine configured to provide power to a working machine, the method comprising the steps of:

receiving a signal indicative of an engine shutdown command;

deriving, inferring or receiving a temperature parameter of the engine system and determining whether the temperature parameter of the engine system is above a first predetermined threshold; and progressively reducing a speed of the engine in the event that the first predetermined threshold is exceeded when the engine shutdown command is received, thereby cooling the engine system; and subsequently issuing a signal to shut down the engine.

* * * * *